US012170003B2

(12) United States Patent
Cicchi et al.

(10) Patent No.: US 12,170,003 B2
(45) **Date of Patent: *Dec. 17, 2024**

(54) SYSTEMS AND METHODS OF ELECTRONIC GAMING INCLUDING AN UPGRADEABLE GAME OBJECT

(71) Applicant: Aristocrat Technologies Australia Pty Limited, North Ryde (AU)

(72) Inventors: Michael Robert Cicchi, Reno, NV (US); Michael Landon Stribling, Reno, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/820,209

(22) Filed: Aug. 16, 2022

(65) Prior Publication Data

US 2022/0392308 A1 Dec. 8, 2022

Related U.S. Application Data

(60) Continuation of application No. 17/076,623, filed on Oct. 21, 2020, now Pat. No. 11,430,298, which is a division of application No. 16/100,953, filed on Aug. 10, 2018, now Pat. No. 10,832,525.

(51) Int. Cl.
*G07F 17/32* (2006.01)

(52) U.S. Cl.
CPC ...... *G07F 17/3262* (2013.01); *G07F 17/3213* (2013.01); *G07F 17/3246* (2013.01)

(58) Field of Classification Search
CPC ............. G07F 17/3262; G07F 17/3213; G07F 17/3246
USPC ...................................................... 463/16–20
See application file for complete search history.

(56) References Cited

U.S. PATENT DOCUMENTS

| | | | | |
|---|---|---|---|---|
| 6,354,939 | B1 | 3/2002 | Morita | |
| 7,182,690 | B2 | 2/2007 | Giobbi | |
| 8,371,925 | B2 * | 2/2013 | Bonney | G07F 17/32 463/16 |
| 8,480,475 | B2 | 7/2013 | Adiraju | |

(Continued)

OTHER PUBLICATIONS

Notice of Allowance dated Jul. 8, 2020 for U.S. Appl. No. 16/100,953 (pages1-7).

(Continued)

*Primary Examiner* — Michael A Cuff
(74) *Attorney, Agent, or Firm* — Armstrong Teasdale LLP

(57) ABSTRACT

A gaming machine presents a game in which an upgradeable object accrues value. The gaming machine includes a player input interface, a credit input mechanism and a game controller configured to perform operations. The game controller presents a primary game, in which a plurality of reels are simulated, spins the plurality of simulated reels each time a player makes a wager, determines, a number of scatter symbols stopped and displayed from the reels, triggers, a bonus game in which an appearance of the upgradeable game object is upgradeable and in which a credit value associated with the upgradeable game object is upgradeable, upgrades the appearance of the object, increases the credit value associated with the object, and adds the credit value associated with the object to the credit balance of the player.

20 Claims, 7 Drawing Sheets

(56) References Cited

U.S. PATENT DOCUMENTS

| | | | | |
|---|---|---|---|---|
| 9,076,283 | B2 | 7/2015 | Hornik | |
| 9,489,792 | B1 | 11/2016 | Buchholz | |
| 2002/0082071 | A1 | 6/2002 | Riendeau | |
| 2003/0157978 | A1 | 8/2003 | Englman | |
| 2003/0224857 | A1* | 12/2003 | Baerlocher | G07F 17/3227 463/42 |
| 2004/0087359 | A1 | 5/2004 | Cuddy | |
| 2004/0102240 | A1* | 5/2004 | Gauselmann | G07F 17/3295 463/20 |
| 2005/0020340 | A1 | 1/2005 | Cannon | |
| 2005/0266915 | A1 | 12/2005 | Isogai | |
| 2006/0009283 | A1 | 1/2006 | Englman | |
| 2006/0135243 | A1 | 6/2006 | Englman | |
| 2006/0160620 | A1 | 7/2006 | Matthews | |
| 2008/0293478 | A1 | 11/2008 | Anderson | |
| 2009/0156303 | A1 | 6/2009 | Kiely | |
| 2010/0056262 | A1 | 3/2010 | Englman | |
| 2010/0248818 | A1 | 9/2010 | Aoki | |
| 2010/0267445 | A1 | 10/2010 | Gomez | |
| 2010/0304825 | A1* | 12/2010 | Davis | G07F 17/3279 463/43 |
| 2010/0317424 | A1 | 12/2010 | Hornik | |
| 2011/0003627 | A1 | 1/2011 | Nicely | |
| 2011/0021259 | A1 | 1/2011 | Acres | |
| 2011/0045895 | A1 | 2/2011 | Gagner | |
| 2011/0117989 | A1 | 5/2011 | Kennedy | |
| 2012/0077588 | A1 | 3/2012 | Apirian | |
| 2012/0115607 | A1 | 5/2012 | Fujisawa | |
| 2012/0244928 | A1 | 9/2012 | Antoon | |
| 2013/0130782 | A1 | 5/2013 | Hornik | |
| 2013/0203478 | A1 | 8/2013 | Kennedy | |
| 2013/0225265 | A1 | 8/2013 | Yamauchi | |
| 2013/0303265 | A1 | 11/2013 | Wilkins | |
| 2014/0094274 | A1 | 4/2014 | Guinn | |
| 2014/0256409 | A1 | 9/2014 | Wood | |
| 2015/0194019 | A1 | 7/2015 | Hornik | |
| 2015/0221169 | A1 | 8/2015 | Filipour | |
| 2015/0328552 | A1 | 11/2015 | Lvov | |
| 2015/0371488 | A1 | 12/2015 | Watkins | |
| 2016/0307394 | A1 | 10/2016 | Nakamura | |
| 2017/0032619 | A1 | 2/2017 | Nguyen | |
| 2017/0337770 | A1 | 11/2017 | Nguyen | |
| 2018/0130297 | A1 | 5/2018 | Todo | |
| 2019/0088092 | A1* | 3/2019 | Matsuda | G07F 17/3225 |
| 2019/0197834 | A1 | 6/2019 | Satterlie | |
| 2022/0148384 | A1* | 5/2022 | McPhail | G07F 17/3272 |

OTHER PUBLICATIONS

Office Action (Non-Final Rejection) dated Mar. 21, 2022 for U.S. Appl. No. 17/076,623 (pp. 1-9).

Office Action (Notice of Allowance and Fees Due (PTOL-85)) dated Jun. 15, 2022 for U.S. Appl. No. 17/076,623 (pp. 1-8).

Office Action (Notice of Allowance and Fees Due (PTOL-85)) dated Jul. 18, 2022 for U.S. Appl. No. 17/076,623 (pp. 1-5).

Australian Examination Report No. 1 issued in App. No. AU2019213444, dated Jul. 10, 2024, 4 pages.

* cited by examiner

SYSTEMS AND METHODS OF ELECTRONIC GAMING INCLUDING AN UPGRADEABLE GAME OBJECT

CROSS REFERENCE TO RELATED APPLICATIONS

This application is a continuation of and claims priority to U.S. patent application Ser. No. 17/076,623, filed Oct. 21, 2020, which is a divisional of U.S. patent application Ser. No. 16/100,953, now U.S. Pat. No. 10,832,525, filed Aug. 10, 2018, each of which is incorporated herein by reference in its entirety.

TECHNICAL FIELD

The field of disclosure relates generally to electronic gaming, and more particularly to systems and methods of electronic gaming in which an upgradeable game object is displayed and upgraded based upon one or more symbol combinations occurring on a plurality of reels.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "paytable" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

As described above, many EGMs are configured to display a secondary game, such as a secondary game triggered from or occurring as a result of an outcome achieved during a primary game. For example, many conventional EGMs may display a secondary game, such as a secondary reel game, in which a player initiates a spin of a plurality of reels presented during the secondary game. Such games do not typically permit a player to make changes to the appearance of one or more game objects, such as, for example, a symbol (e.g., a house, a vehicle, etc.) that is displayed in association with a value (e.g., a value of the house, the car, etc.), and which may be visually upgraded, improved, and/or otherwise enhanced during gameplay.

Accordingly, systems and methods for electronic gaming that include displaying an upgradeable game object (e.g. a house, a car, etc.) are desirable. More particularly, systems and methods that include an upgradeable game object being displayed, such as during a secondary game, and in which the upgradeable game object is upgradeable based upon one or more symbol combinations occurring during the secondary game, are desirable.

BRIEF DESCRIPTION

In one aspect, an electronic gaming machine is provided. The electronic gaming machine includes a first display, a second display, a player input interface configured to receive a player input, a credit input mechanism including at least one of a card reader, a ticket reader, a bill validator, and a coin input mechanism, the credit input mechanism configured to receive a credit balance, and a game controller. The game controller is configured to perform operations including: (i) simulating, on the first display, a plurality of reels, each reel of the simulated plurality of reels comprising a plurality of symbols; (ii) presenting, on the second display, the upgradeable game object, the upgradeable game object having a visual appearance that is upgradeable during the wagering game, the upgradeable game object further associated with a credit value that is increasable during the wagering game; (iii) spinning and stopping, on the first display, each reel of the simulated rotating plurality of reels, whereby symbols from each reel are stopped and displayed; (iv) determining that the symbols stopped and displayed from each of the simulated plurality of reels include a number of special symbols greater than at least a threshold number of special symbols; (v) depicting, on the second display and in response to the determining, a first upgrade to the visual appearance of the upgradeable game object; (vi) increasing, in addition to depicting the first upgrade to the visual appearance of the upgradeable game object, the credit value of the upgradeable game object by a first credit amount; and (vii) adding, in response to a specified trigger event, the credit value associated with the upgradeable object to the credit balance of the player.

In another aspect, an electronic gaming machine is provided. The electronic gaming machine includes a player input interface configured to receive a player input, a credit input mechanism including at least one of a card reader, a ticket reader, a bill validator, and a coin input mechanism, the credit input mechanism configured to receive a credit balance, and a game controller. The game controller is configured to perform operations including: (i) presenting a reel-based primary game, in which a plurality of reels are simulated, each reel of the plurality of simulated reels including a plurality of symbols; (ii) spinning and stopping the plurality of simulated reels each time a player makes a wager, whereby symbols are stopped and displayed from each of the simulated plurality of reels in conjunction with each player wager; (iii) determining, each time the plurality of simulated reels are spun and stopped, a number of scatter symbols stopped and displayed from each of the plurality of simulated reels; (iv) triggering, in response to the number of scatter symbols, a bonus game in which an appearance of the upgradeable game object is upgradeable and in which a credit value associated with the upgradeable game object is upgradeable; (v) upgrading, during the bonus game, the appearance of the upgradeable game object; (vi) increasing, during the bonus game, the credit value associated with the upgradeable game object; and (vii) adding, in response to a specified trigger event, the credit value associated with the upgradeable game object to the credit balance of the player.

In yet another aspect, a method for presenting a wagering game on an electronic gaming machine in which an upgradeable game object is displayed and accrues value during the wagering game is provided. The electronic gaming machine includes a display configured to present the wagering game, a player input interface, a game controller, and a credit input mechanism including at least one of a card reader, a ticket reader, a bill validator, and a coin input mechanism, the credit input mechanism configured to establish a credit balance that is increasable and decreasable based on wagering activity. The method includes: (i) simulating, by the game controller, a plurality of reels, each reel of the simulated plurality of reels comprising a plurality of symbols; (ii) presenting, by the game controller, the upgradeable game object, the upgradeable game object having a visual appearance that is upgradeable during the wagering game, the upgradeable game object further associated with a credit value that is increasable during the wagering game; (iii) spinning and stopping, by the game controller, each reel of the simulated rotating plurality of reels, whereby symbols from each reel are stopped and displayed; (iv) determining, by the game controller, that the symbols stopped and displayed from each of the simulated plurality of reels include a number of special symbols greater than at least a threshold number of special symbols; (v) depicting, by the game controller and in response to the determining, a first upgrade to the visual appearance of the upgradeable game object; (vi) increasing, by the game controller and in addition to depicting the first upgrade to the visual appearance of the upgradeable game object, the credit value of the upgradeable game object by a first credit amount; and (vii) adding, by the game controller and in response to a specified trigger event, the credit value associated with the upgradeable object to the credit balance of the player.

BRIEF DESCRIPTION OF THE DRAWINGS

An example embodiment of the subject matter disclosed will now be described with reference to the accompanying drawings.

DETAILED DESCRIPTION

An electronic gaming machine configured to present a wagering game that includes an upgradeable game object is described, wherein the upgradeable game object is displayed during the wagering game, and wherein the upgradeable game object may be upgraded and accrue value. For example, an upgradeable game object may include any of a variety of objects or symbols, such as, for example, a house, a car, and/or any other visually displayed symbol or object that may be associated with a credit value and/or a visual appearance, and that may be upgraded, improved, constructed, or otherwise created or enhanced. In the case of a house, for example, the house may be associated with an initial credit value and an initial visual appearance. During gameplay, the house may be upgraded or improved (e.g., renovated), such that the initial credit value increases (e.g., such that the house accrues or accumulates value), and such that the initial visual appearance (which may include a dilapidated or otherwise incomplete or unfinished appearance) is also gradually or incrementally improved. Thus, an upgradeable game object, such as a house, may include an initial or starting credit value and an initial or starting visual appearance. As gameplay progresses, the upgradeable game object may be upgraded, improved, enhanced, constructed, or otherwise altered, such that the upgradeable game object is associated with an accrued or accumulated credit value and an upgraded or otherwise improved visual appearance.

In at least one embodiment, a plurality of reels of the wagering game are spun and stopped, and a game outcome is determined based upon one or more symbol combinations occurring on the spun and stopped reels. If a minimum number of special symbols, such as at least three scatter symbols, are displayed, the upgradeable game object may be upgraded. As described above, during the upgrade, a visual appearance of the upgradeable game object may be incrementally improved or upgraded, such as, for example, from one stage of completion to a next, upgraded, stage of completion. In addition, a credit value associated with the upgradeable game object may be increased, such that the upgradeable game object is, over time, associated with an accrued or accumulated credit value. The plurality of reels may be further evaluated to determine whether a specified trigger condition has occurred. In some embodiments, the specified trigger condition may be triggered in response to the occurrence of a minimum number of trigger symbols, such as a minimum number of “for sale” or “auction” symbols. In response to occurrence of the trigger condition, the upgradeable game object may be "sold" or "auctioned" and a credit value (e.g., the accrued credit value) of the upgradeable game object added to a player's credit balance.

Figure 1:
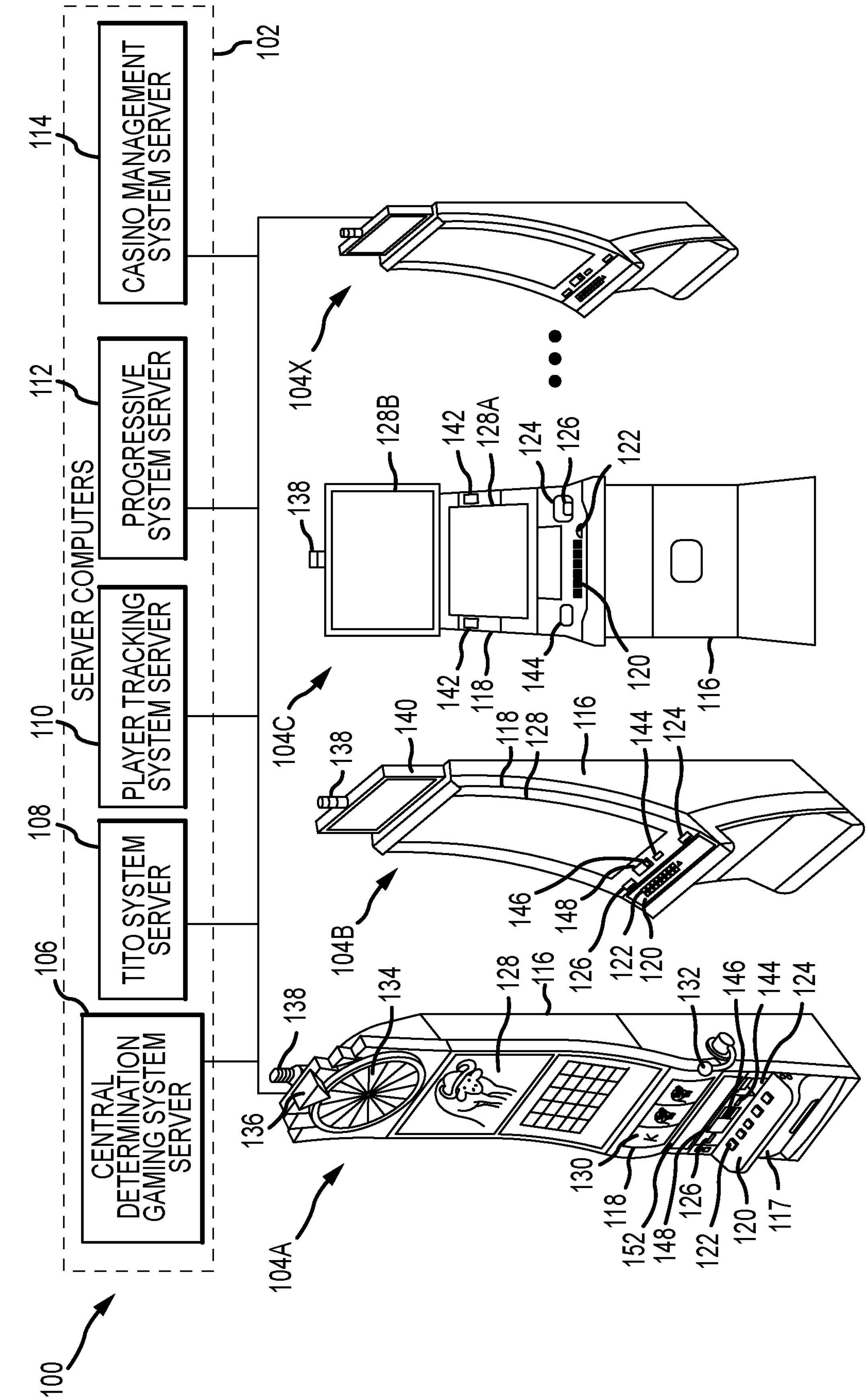
FIG. 1 is a diagram of exemplary EGMs networked with various gaming-related servers.

FIG. 1 is a diagram of exemplary EGMs networked with various gaming-related servers in a gaming system 100. Gaming system 100 operates in a gaming environment, including one or more servers, or server computers, such as slot servers of a casino, that are in communication, via a communications network, with one or more EGMs, or gaming devices 104A-104X, such as EGMs, slot machines, video poker machines, or bingo machines, for example. Gaming devices 104A-104X may, in the alternative, be portable and/or remote gaming devices such as, for example, and without limitation, a smart phone, a tablet, a laptop, or a game console.

Communication between gaming devices 104A-104X and servers 102, and among gaming devices 104A-104X, may be direct or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In certain embodiments, servers 102 may not be necessary and/or preferred. For example, the present invention may, in one or more embodiments, be practiced on a stand-alone gaming device such as gaming device 104A and/or gaming device 104A in communication with only one or more other gaming devices 104B-104X (i.e., without servers 102).

Servers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, a game outcome may be generated on a central determination gaming system server 106 and then transmitted over the network to any of a group of remote terminals or remote gaming devices 104A-104X that utilize the game outcome and display the result to the player.

Gaming device 104A is often of a cabinet construction that may be aligned in rows or banks of similar devices for placement and operation on a casino floor. The gaming device 104A often includes a main door 117 that provides access to the interior of the cabinet. Gaming device 104A typically includes a button area or button deck 120 accessible by a player that is configured with input switches or buttons 122, a bill validator 124, and/or ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed there on. Reels 130 are then independently spun and stopped to show a set of symbols within the gaming display area 118 that may be used to determine an outcome to the game.

In many configurations, gaming machine 104A may have a main display 128 (e.g., video display monitor) mounted to, or above, gaming display area 118. Main display 128 may be, for example, a high-resolution LCD, plasma, LED, or OLED panel that may be flat or curved as shown, a cathode ray tube, or other conventional electronically controlled video monitor.

In certain embodiments, bill validator 124 may also function as a "ticket-in" reader that enables the player to use a casino-issued credit ticket to load credits onto gaming device 104A (e.g., in a cashless TITO system). In such cashless embodiments, gaming device 104A may also include a "ticket-out" printer 126 for outputting a credit ticket when a "cash out" button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A.

In certain embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within gaming device 104A communicates with player tracking server system 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
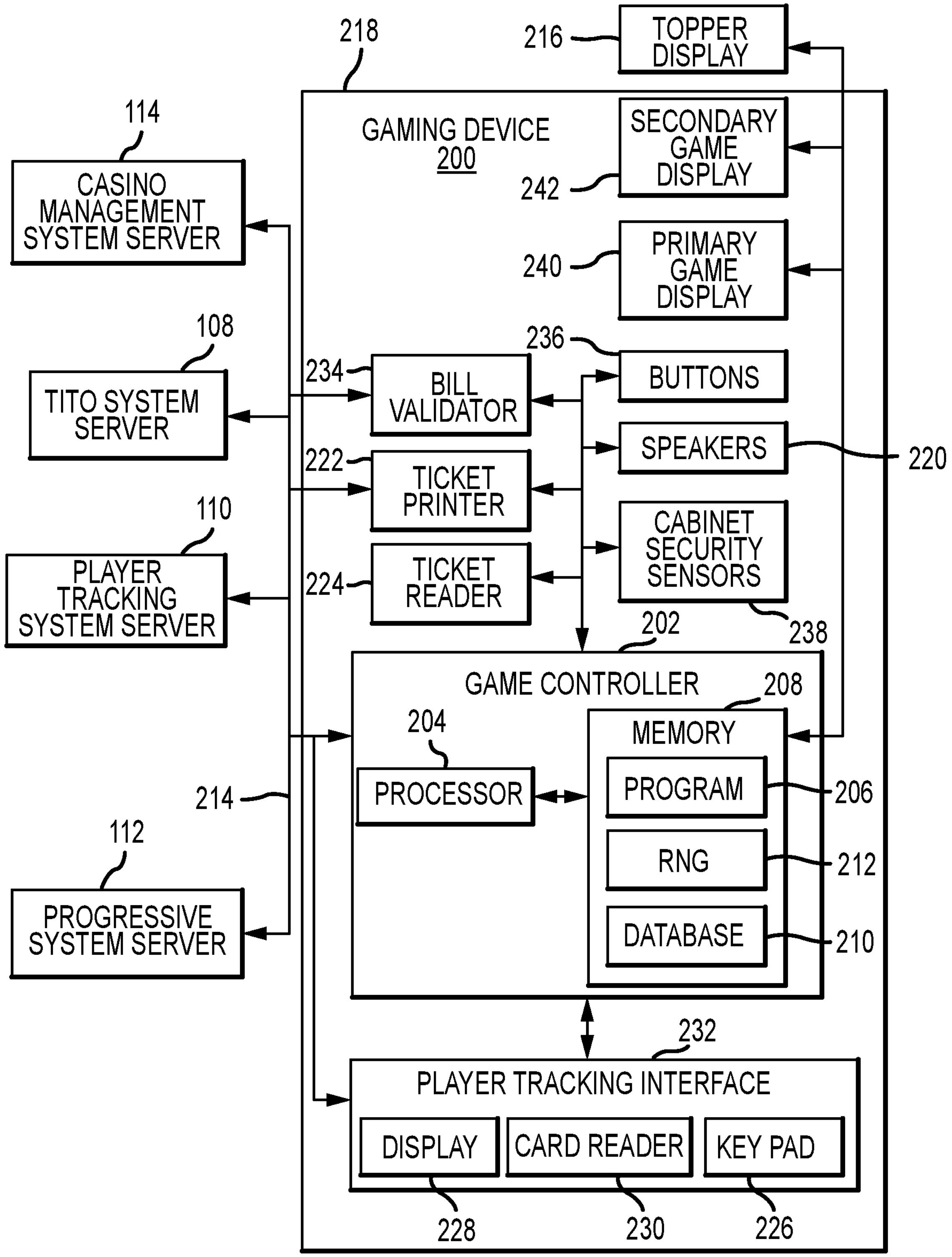
FIG. 2 is a block diagram of an exemplary EGM.

Many or all of the above described components may be controlled by circuitry (e.g., a gaming controller) housed inside main cabinet 116 of gaming device 104A, the details of which are shown in FIG. 2.

Not all gaming devices suitable for implementing embodiments of the gaming systems, gaming devices, or methods described herein necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

Exemplary gaming device 104B shown in FIG. 1 is an Arc™ model gaming device manufactured by Aristocrat® Technologies, Inc. Where possible, reference numeral identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Gaming device 104B includes main cabinet 116 having main door 117 that opens to provide access to the interior of gaming device 104B. Main door 117, or service door, is typically used by service personnel to refill ticket-out printer 126 and collect bills and tickets inserted into bill validator 124. Main door 117 may further be accessed to reset the machine, verify and/or upgrade the software, and for general maintenance operations.

Exemplary gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A may include a curvature radius from top to bottom. In certain embodiments, display 128A is a flat panel display. Main display 128A is typically used for primary game play while a secondary display 128B is used for bonus game play, to show game features or attraction activities while the game is not in play, or any other information or media desired by the game designer or operator.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases 210 may be included in one or more databases 210 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a game instance, or round of play of the game, may be generated on a remote gaming device such as central determination gaming system server 106, shown in FIG. 1. The game instance is communicated to gaming device 200 via a network 214 and is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM), or from central determination gaming system server 106 into memory 208. Memory 208 includes at least one section of ROM, random access memory (RAM), or other form of storage media that stores instructions for execution by processor 204.

Gaming device 200 includes a topper display 216. In an alternative embodiment, gaming device 200 includes another form of a top box such as, for example, a topper wheel, or other topper display that sits on top of main cabinet 218. Main cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232*a*. Player tracking interface 232*a* may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, buttons 236 for player input, cabinet security sensors 238 to detect unauthorized opening of main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered and time of play) for individual players so that an operator may reward players in a loyalty program. The player may use player tracking interface 232*a* to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4)

fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome on game displays 240 and 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

Figure 3:
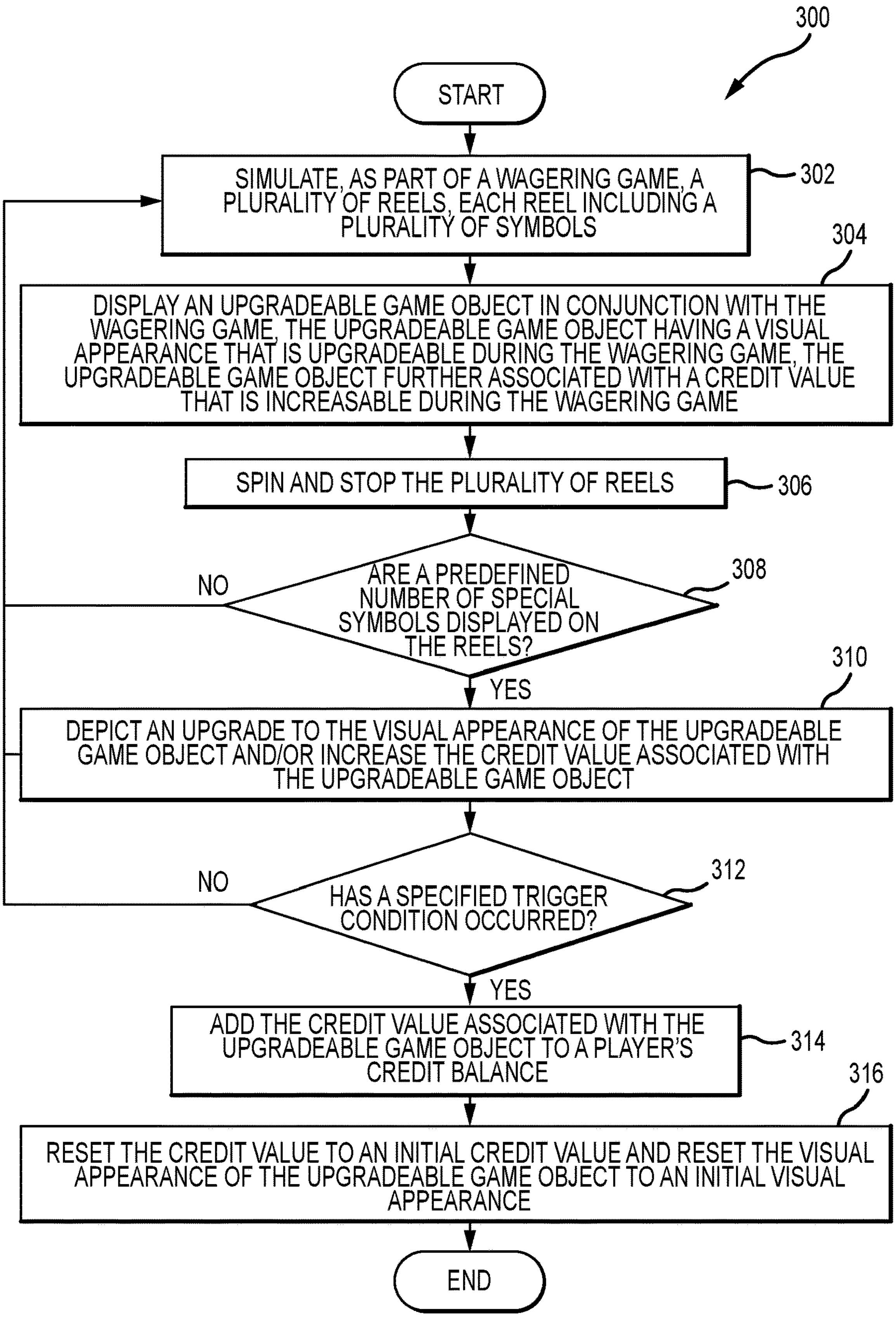
FIG. 3 is a flowchart illustrating an exemplary process for presenting a wagering game in which an upgradeable game object is displayed and accrues value during play of the wagering game.
Figure 4:
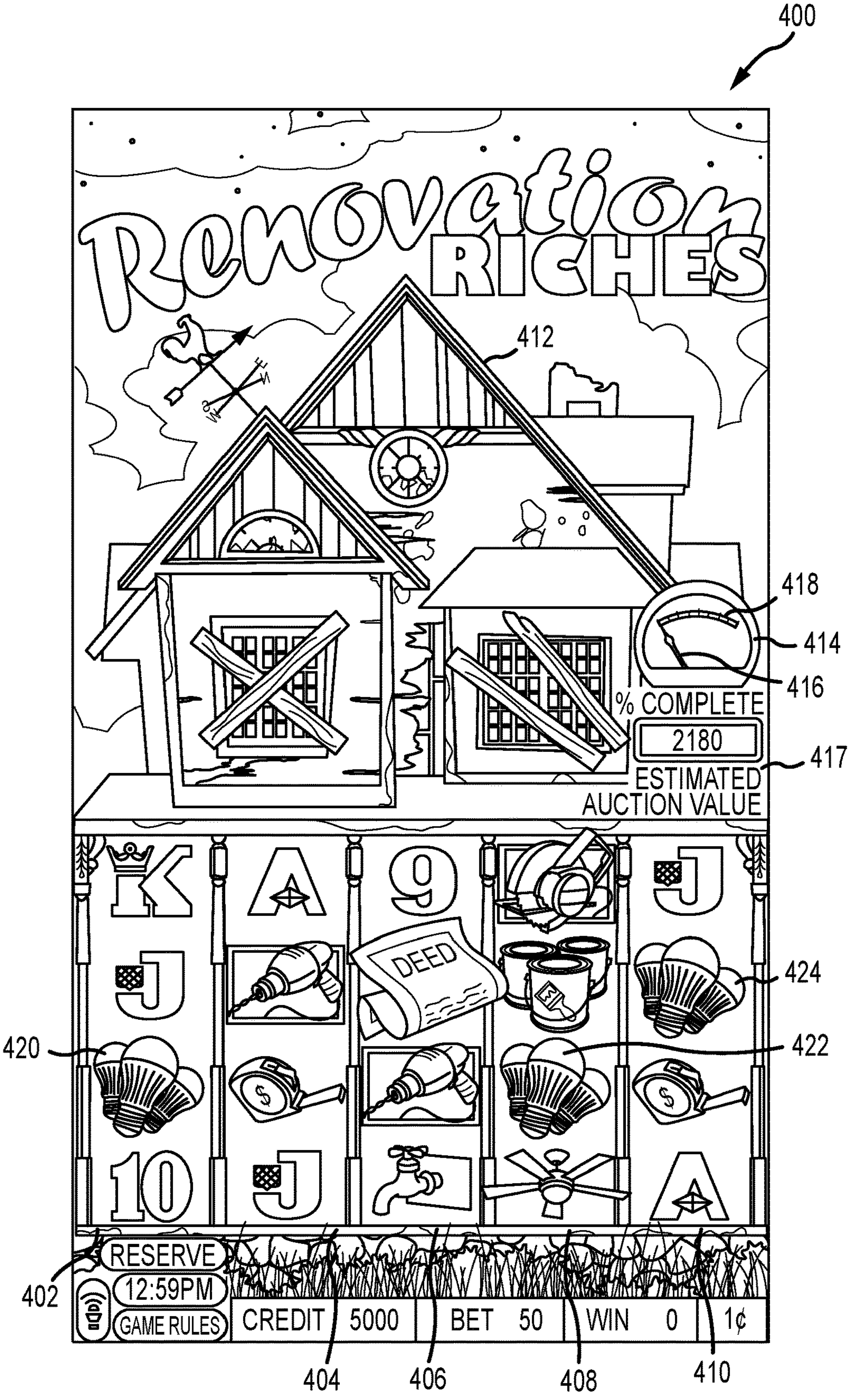
FIG. 4 is a schematic view of an exemplary wagering game, in which a plurality of reels are displayed, and in which an upgradeable game object is displayed.

FIG. 3 is a flowchart illustrating an exemplary process 300 for presenting a wagering game in which an upgradeable game object is displayed and accrues value during play of the wagering game. FIG. 4 illustrates the wagering game 400.

As described herein, the upgradeable game object may include a variety of objects, such as, for example, a house or a vehicle. In the case of a house, during gameplay, the upgradeable game object may be displayed in association with an initial visual appearance that indicates an unimproved or non-upgraded condition of the house (e.g., a dilapidated or unimproved house may be displayed). Further, during gameplay, and the upgradeable game object (e.g., the house) may be incrementally upgraded or improved based upon consecutive gameplay outcomes, such that the visual appearance of the upgradeable game object transitions from an unimproved condition to a renovated condition. A credit value associated with the upgradeable game object may also be incrementally increased, such that the credit value of the upgradeable game object increases as the house is upgraded or renovated. In other words, the upgradeable game object may also accrue value during gameplay, such that a credit value (or accrued credit value) increases from the initial credit value to the accrued credit value each time the upgradeable game object is upgraded, improved, constructed, or otherwise enhanced.

Accordingly, wagering game 400 may be displayed or presented by any of EGMs 104A-104X (as shown in FIG. 1 and FIG. 2). In the exemplary embodiment, wagering game 400 may include a plurality of reels, such as a first reel 402, a second reel 404, a third reel 406, a fourth reel 408, and/or a fifth reel 410. Wagering game 400 also includes at least one upgradeable game object 412 (described in additional detail below).

In various embodiments, reels 402-410 may include simulated or "virtual" reels generated and displayed by game controller 202 on primary game display 240 and/or secondary game display 242. In other embodiments, reels 402-410 may include one or more physical or mechanical reels having a display element, such as a liquid crystal display (LCD), capable of displaying one or more symbols during gameplay. In other embodiments, reels 400 may include a plurality of mechanical reels overlaid by an LCD panel.

Each reel 402-410 may include a plurality of symbols, such as, for example, a plurality of symbols in the range of ten to several thousand symbols. In the exemplary embodiment, some of the symbols of each reel 402-410 are "special" symbols. As used herein, a "special" symbol may include any symbol capable of triggering an upgrade to upgradeable game object 412. For example, in at least one embodiment, a "special" symbol may be a scatter symbol, such as any symbol which may, in combination with at least one other such symbol, trigger an upgrade to upgradeable game object 412.

Reels 402-410 may, in addition, include one or more trigger symbols, such as one or more "auction" or "for sale" symbols. As described herein, one or more "auction" or "for sale" symbols may be presented during play of wagering game 400. If a sufficient number (e.g., greater than three) of such symbols are presented, a credit value of upgradeable game object 412 may be provided or awarded to a player of wagering game 400. In some embodiments the credit value may be an estimated auction value 417, which provides an indication of the potential "sale" or "auction" value of upgradable game object 412.

In addition to special symbols and trigger symbols, each reel 402-410 may include a plurality of "standard" symbols. As used herein, a "standard" symbol may include any symbol that is not a special symbol or a trigger symbol. Thus, reels 402-410 may include one or more special symbols, one or more trigger symbols, and/or a plurality of standard symbols.

In the exemplary embodiment, upgradeable game object 412 may be any object capable of receiving and/or displaying one or more upgrades or improvements, such as one or more upgrades or improvements to its visual appearance. Examples of upgradeable game object 412 include houses, cars, recreational vehicles, and/or any of a variety of other such objects. Like reels 402-410, upgradeable game object may be displayed by game controller 202 on primary game display 240 and/or secondary game display 242.

It will be appreciated that any suitable upgradeable game object 412 may be used. For example, an upgradeable game object 412 may be determined during game design based upon a theme of wagering game 400. Exemplary themes include home improvement based themes, transportation or vehicle based themes, and the like.

Accordingly, upgradeable game object 412 may include any object capable of receiving and/or displaying one or more incremental upgrades or improvements, such as one or more incremental upgrades or improvements to its visual appearance and/or one or more incremental upgrades to, or increases in, a credit value associated therewith. In the example described herein, wagering game 400 is home improvement themed, and upgradeable game object 412 is a house. Where upgradeable game object 412 is a house, each upgrade may bring the house closer to a fully renovated condition. Similarly, where upgradeable game object 412 is a vehicle, such as a car, each upgrade may bring the vehicle one step closer to a fully restored condition.

In the exemplary embodiment, any number of upgrades may be applied to an upgradeable game object 412. For instance, in at least some embodiments, upgradeable game object 412 may be capable of receiving three distinct upgrades, each of which may bring upgradeable game object 412 one step closer to a fully renovated, restored, or otherwise improved condition. Although three improvements to upgradeable game object 412 are described herein, it will be appreciated that any suitable number of upgrades or improvements may be applied, during gameplay, to upgradeable game object 412.

Accordingly, upgradeable game object 412 may be associated with a plurality of discrete or distinct visual appearances or stages of completion, each of which may be shown or displayed during gameplay to indicate a status or condition of upgradeable game object 412 (e.g., not renovated, partially renovated, fully renovated, etc.). In one embodiment, each time upgradeable game object 412 is upgraded, as described herein, one of the discrete visual appearances, or stages of completion, may be displayed to indicate that upgradeable game object 412 has been upgraded.

For example, in the case of a house, upgradeable game object 412 may be associated with a first visual appearance (or a first stage of completion) in which the house is dilapidated or otherwise unimproved, second and third visual appearances (or second and third stages of completion) in which the house is improved but not fully renovated, and a fourth and final visual appearance (or a fourth stage of completion) in which the house is fully renovated or improved. Again, however, any suitable number of discrete visual appearances may be used in conjunction with wagering game 400.

Upgradeable game object 412 may, in addition, be associated with a credit value. For example, prior to receiving an upgrade, upgradeable game object 412 may be associated with an initial credit value, such as a value of zero credits and/or another starting or initial credit value. However, as upgradeable game object 412 is renovated and/or otherwise improved, a credit value of upgradeable game object 412 may increase. For example, in at least some embodiments, a credit value of upgradeable game object 412 may increase each time a visual appearance of upgradeable game object 412 is also upgraded (e.g., each time upgradeable game object 412 is transitioned or upgraded to a new or next stage of completion).

In the exemplary embodiment, a completion meter 414 may also be displayed during wagering game 400. Completion meter 414 may include a needle or pointer 416 and a range of completion 418. In the exemplary embodiment, range of completion 418 may include or indicate several discrete ranges or zones of completion, each of which may correspond to one of the plurality of discrete visual appearances/stages of completion.

For example, in at least one embodiment, completion meter 414 may include or indicate a first zone of completion corresponding to a first upgrade, or a first stage of completion, of upgradeable game object 412, a second zone of completion corresponding to a second upgrade, or a second stage of completion, of upgradeable game object 412, a third zone of completion corresponding to a third upgrade, or a third stage of completion, of upgradeable game object 412, and/or a fourth zone of completion corresponding to a fourth upgrade, or a fourth stage of completion, of upgradeable game object 412. Thus, each zone of completion may correspond to a specific stage of completion of upgradeable game object 412.

In other embodiments, completion meter 414 does not include discrete zones of completion. Rather, in at least some embodiments, completion meter 414 includes a continuous range of completion. In such an embodiment, a starting point of the range may generally correspond to an upgradeable game object 412 that has not been upgraded or improved (e.g., the first stage of completion), while an endpoint of the range may correspond to an upgradeable game object 412 that has been fully upgraded or improved (e.g., the fourth stage of completion).

Pointer 416 may be configured to point to a specific zone of completion based upon a player's progress during play of wagering game 400. Similarly, pointer 416 may be configured to point, in general, to an area of a continuous range of completion based upon the player's progress during wagering game 400. For instance, pointer 416 may point to a first zone of completion in response to a first upgrade to upgradeable game object 412, a second zone of completion in response to a second upgrade to upgradeable game object 412, a third zone of completion in response to a third upgrade to upgradeable game object 412, and/or a fourth zone of completion in response to a fourth upgrade to upgradeable game object 412.

Returning now to FIG. 3, during gameplay, game controller 202 may simulate reels 402-410 (step 302), and display, in conjunction with reels 402-410, upgradeable game object 412 (step 304). For example, in at least one embodiment, reels 402-410 may be simulated on primary game display 240, and upgradeable game object 412 may be displayed on secondary game display 242. However, in other embodiments, reels 402-410 and upgradeable game object 412 may be displayed together on a single display, and/or upgradeable game object 412 may be displayed on primary game display 240, while reels 402-410 are displayed on secondary game display 242.

In the exemplary embodiment, reels 402-410 may be spun and stopped to display a subset of the symbols of each reel 402-410 (step 306). As described above, each reel 402-410 may include a variety of symbols, such as one or more standard symbols, one or more special symbols, and/or one or more trigger symbols. Combinations of special symbols on reels 402-410 may trigger an upgrade to upgradeable game object 412. Combinations of trigger symbols may, as described herein, trigger a credit award to a player of wagering game 400, such as a credit award corresponding to a credit value of upgradeable game object 412.

At the start of gameplay (e.g., before reels 402-410 are spun and stopped), upgradeable game object 412 may be associated with an initial or unimproved visual appearance (e.g., the first stage of completion). For instance, where upgradeable game object 412 is a house, a visual appearance of the house may begin in an unimproved or dilapidated condition. An unimproved house in a first stage of completion is shown with reference to FIG. 4.

After reels 402-410 are spun and stopped, game controller 202 may evaluate the symbols stopped and displayed from each reel 402-410 to determine whether a predefined number of special symbols are stopped and displayed from reels 402-410 (step 308). As described above, special symbols may, in combination, trigger an upgrade or improvement to upgradeable game object 412. As described above, special symbols may, in at least some embodiments, include scatter symbols which may trigger an upgrade if a sufficient number of such symbols are scattered over reels 402-410. In the example depicted at FIG. 4, there are three special symbols displayed. Specifically, a first special symbol 420, a second special symbol 422, and a third special symbol 424 are stopped and displayed from reels 402-410.

In the example of FIG. 4, three or more special symbols may be sufficient to trigger an upgrade to upgradeable game object 412. However, it will be appreciated that any threshold number of special symbols may be established, such as, for example, in conjunction with one or more other game rules.

Figure 5:
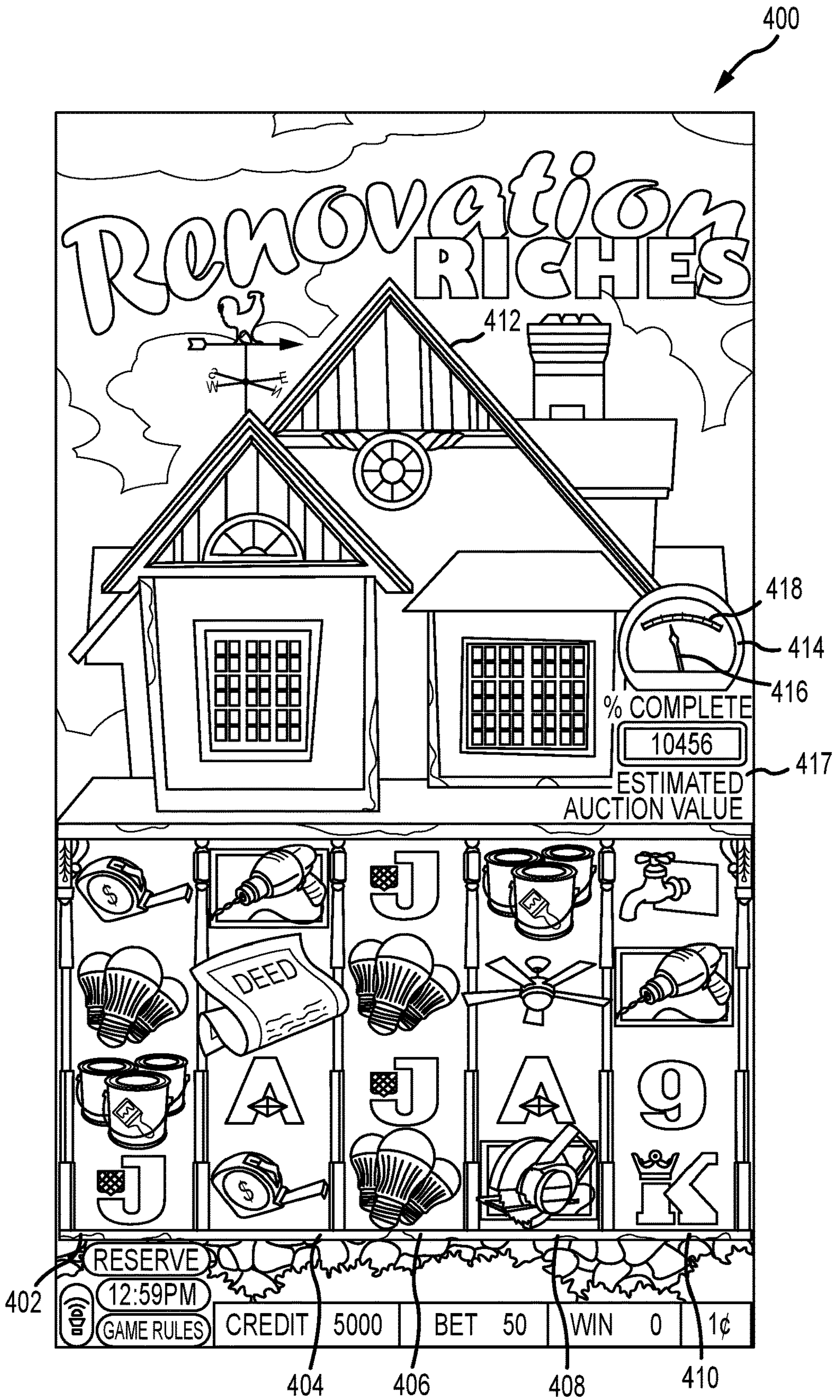
FIG. 5 is a schematic view of the wagering game shown at FIG. 4, in which a visual appearance of the upgradeable game object is upgraded a first time, and in which a credit value associated with the upgradeable game object is increased a first time.

In response to determining that a sufficient number of special symbols are stopped and displayed from reels 402-410, game controller 202 may upgrade or improve upgradeable game object 412 (step 310). Specifically, in at least some embodiments, game controller 202 may depict an improvement or upgrade to a visual appearance of upgradeable game object 412. For example, as described above, a visual appearance of upgradeable game object 412 may be altered or changed from a first, unimproved, visual appearance (e.g., the first stage of completion), as shown at FIG. 4, to a second, partially improved, visual appearance (e.g., the second stage of completion), as shown at FIG. 5.

Specifically, as shown at FIG. 4, the first visual appearance or first stage of completion may depict a house in which the windows are broken and/or boarded up, and/or which otherwise indicates a dilapidated and/or unimproved condition of the house. In contrast, as shown at FIG. 5, the second visual appearance or second stage of completion of upgradeable game object 412 may depict a house in which the windows have been repaired, the boards covering the windows and/or other areas of the house have been removed, and the like. Pointer 416 of completion meter 414 may, in addition, be moved by game controller 202 to correspond to a location and/or an area of range of completion 418 that is indicative of the renovation or upgrade status of the house. Specifically, pointer 416 may be moved from an area of range of completion 418 corresponding to the first stage of completion to another area of range of completion 418 corresponding to the second stage of completion.

In addition to depicting an improvement to the visual appearance of upgradeable game object 412, game controller may increase a credit value associated with upgradeable game object 412 in response to determining that a sufficient number of special symbols are stopped and displayed from reels 402-410 (step 310). For example, game controller 202 may increase a credit value of upgradeable game object 412 based upon a number of special symbols stopped and displayed from reels 402-410. As the number of special symbols stopped and displayed increases, game controller 202 may add increasingly larger increments to the credit value of upgradeable game object 412. Thus, a credit value associated with upgradeable game object 412 may increase, during gameplay, from an initial credit value through a series of accrued credit values.

In another embodiment, the credit value added to upgradeable game object 412 may be based upon an evaluation of the plurality of standard symbols displayed from reels 402-410. For example, game controller 202 may evaluate the standard symbols stopped and displayed from reels 402-410 against a paytable of winning outcomes to determine a credit increment to add to the credit value of upgradeable game object 412. In some embodiments, the standard symbols may also be evaluated to determine one or more game awards or "line wins," the value of which may not be added to the accrued value of upgradeable game object 412 but awarded directly to the player.

In some embodiments, a player may be allowed to select an area of upgradeable game object 412 that will receive an upgrade. For example, a player may be provided an option to choose an exterior upgrade to the house and/or an interior upgrade to the house (note that interior upgrades are not illustrated in the Figures but are contemplated by and within the scope of the present disclosure). Similarly, or in addition, a player may be provided an option to select an external area of the house to be upgraded and/or an interior area of the house to be upgraded.

Further still, in at least some embodiments, a player may be provided an option to select a level of upgrade. For example, several upgrade volatility options may be provided, such as a low volatility upgrade option, a mid-level volatility upgrade option, and/or a high volatility upgrade option. The low volatility upgrade option may correspond, if selected by the player, to a lowest bet level selected by a player and/or a lowest or least significant upgrade to the house. Likewise, the mid-level volatility upgrade option may correspond to a mid-level bet and/or a mid-level upgrade to the house, and the high volatility upgrade option may correspond to a highest bet level and/or a most significant upgrade to the house. Higher volatility upgrades may thus correspond to more significant upgrades, which may, in turn, be associated with larger increments to the credit value of upgradeable game object 412.

In particular, and in at least one embodiment, a low volatility upgrade may require a smallest player wager and may result in a smallest or least significant improvement or upgrade to a visual appearance of upgradeable game object 412. Likewise, a low volatility upgrade may result in a smallest increase in the credit value associated with upgradeable game object 412. Similarly, a mid-level volatility upgrade may request a mid-level or intermediate wager and may result in a mid-level or intermediate upgrade to the visual appearance and credit value of upgradeable game object 412. Likewise, a high volatility upgrade may request a largest player wager and may result in a largest or most significant upgrade to the visual appearance and credit value of upgradeable game object 412.

Additionally, in other embodiments, the player may be provided an option to select a level of upgrade volatility. For example, several upgrade volatility options may be provided, such as a low volatility upgrade option, a mid-level volatility upgrade option, and/or a high volatility upgrade option. The low volatility option may correspond to a higher probability of an upgrade being awarded, with a greater probability that the upgrade will be of a lowest or least significant upgrade to the upgradable game object 412. Likewise, the mid-level volatility option may correspond to a mid-level probability of an upgrade being awarded, with a greater probability that the upgrade will be of a mid-level upgrade to the upgradable game object 412, and the high volatility option may correspond to a lower probability of an upgrade being awarded, with a greater probability that the upgrade will be of a highest or most significant upgrade to the upgradable game object 412. In the exemplary embodiment, game controller 202 may evaluate the symbols stopped and displayed from reels 402-410 to determine whether a specified trigger condition has occurred (step 312). In particular, game controller 202 may evaluate the symbols stopped and displayed from reels 402-410 to determine whether a specified number of "auction" or "for sale" symbols are stopped and displayed. In some embodiments, three or more specified trigger symbols may be sufficient to satisfy the trigger condition. However, it will be appreciated that the trigger condition may be satisfied, in various embodiments, by greater or fewer than three trigger symbols. As described herein, during an "auction," an accrued credit value of upgradeable game object 412 may be added to a player's credit balance. Similarly, during a "sale," one or more players (e.g., during a multiplayer game) may bid on upgradeable game object 412. The "sale price" of upgradeable game object 412 may be larger or smaller than the accrued credit value. Further, the sale price (which may be denoted in terms of game credits or an actual currency value) may be deducted from a player's credit balance "purchasing" upgradeable game object 412 and added to the player's credit balance selling upgradeable game object 412.

If the trigger condition is not satisfied, game controller 202 may re-spin and stop reels 402-410 to display another group of symbols from reels 402-410 (step 306). The new group of symbols may be evaluated, as described above, to determine whether a predefined number of special symbols (e.g., scatter symbols) are displayed on reels 402-410 (step 308). If the predefined number of special symbols are stopped and displayed from reels 402-410, game controller may depict a further upgrade to the visual appearance of upgradeable game object 412 and further increase the credit value associated with upgradeable game object 412 (step 310). This process may continue until a specified trigger condition occurs (e.g., as described below), until upgradeable game object 412 is completely upgraded or improved, and/or until the player selects an option to cash out of wagering game 400.

Figure 6:
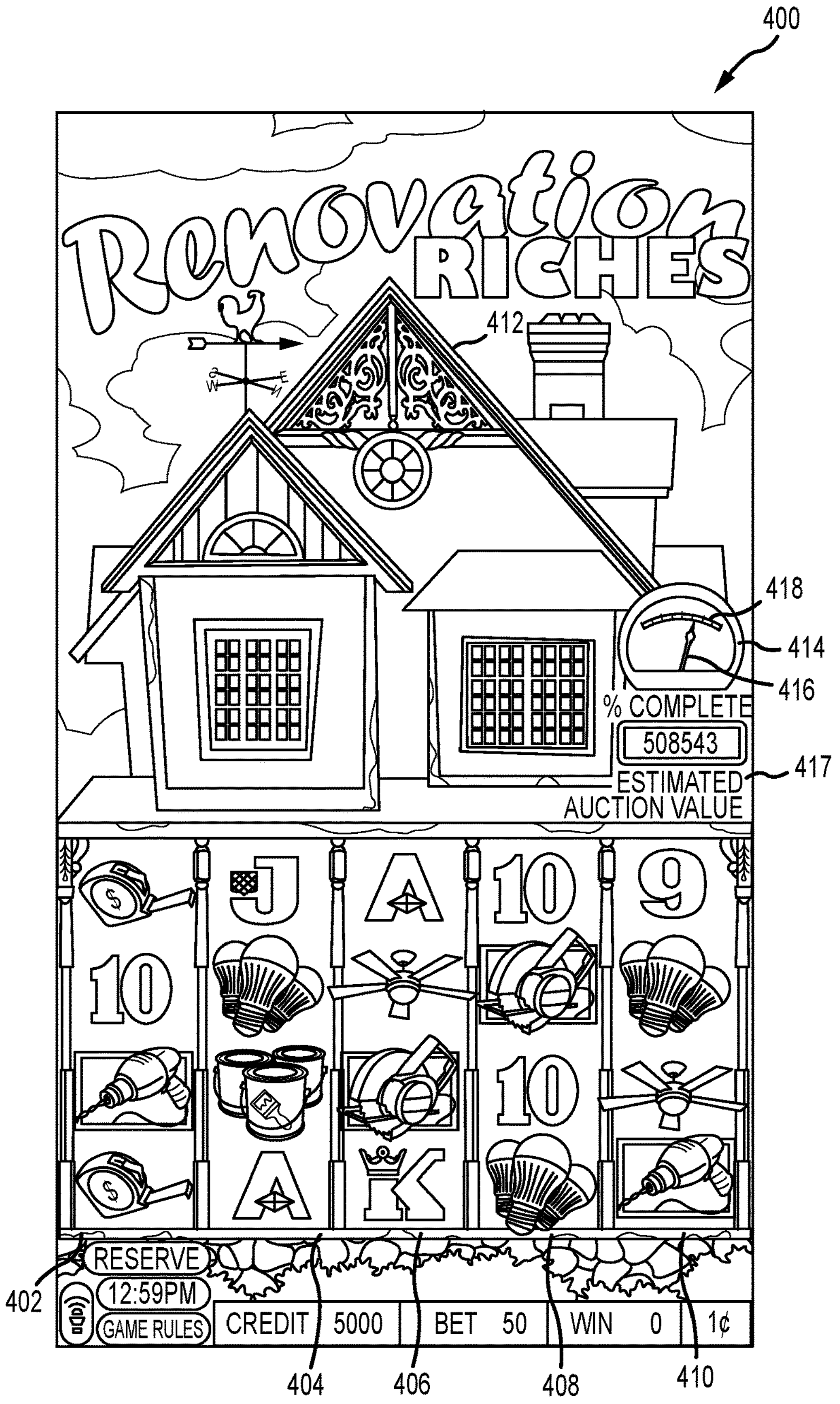
FIG. 6 is a schematic view of the wagering game shown at FIG. 4 and FIG. 5, in which a visual appearance of the upgradeable game object is upgraded a second time, and in which a credit value associated with the upgradeable game object is increased a second time.
Figure 7:
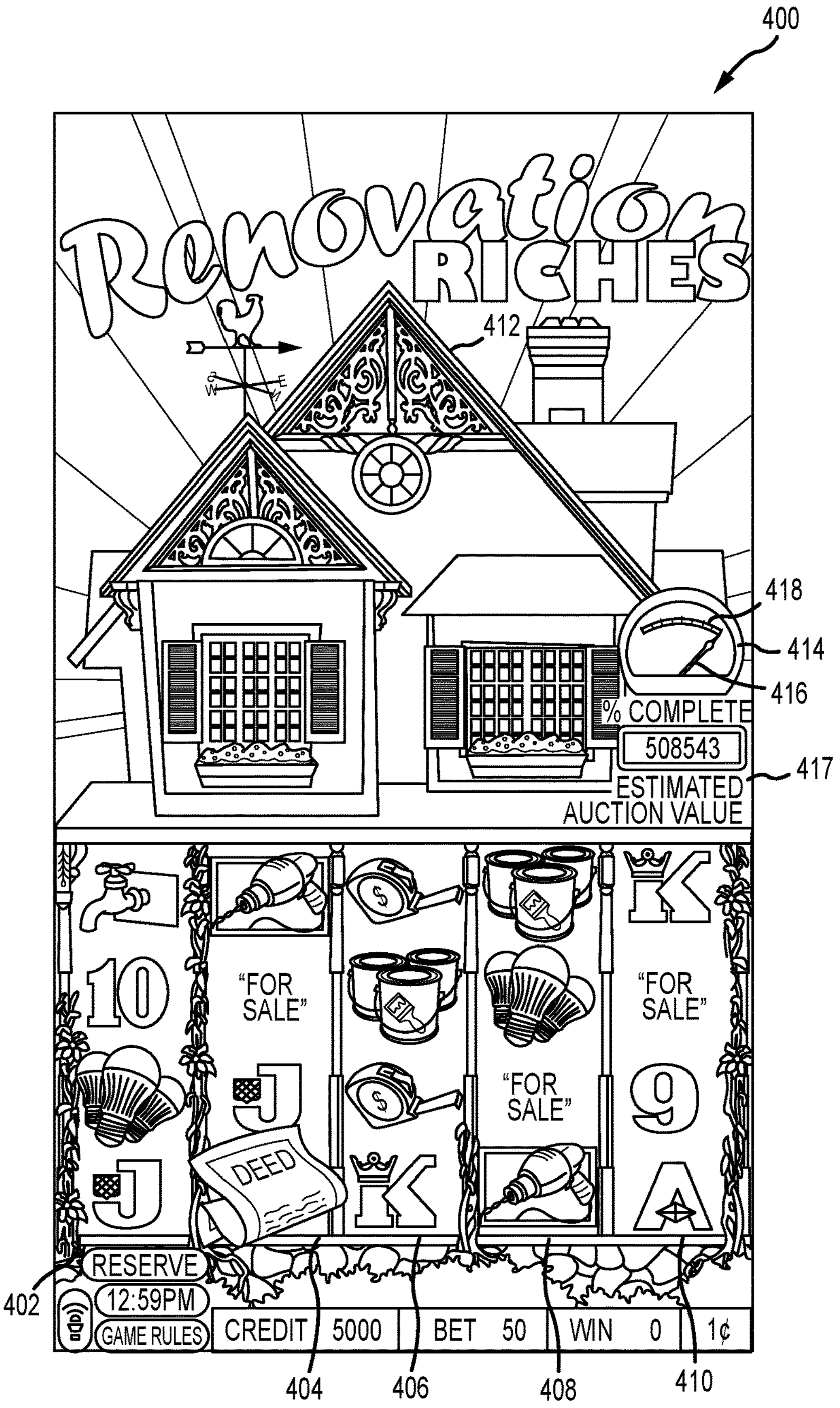
FIG. 7 is a schematic view of the wagering game shown at FIGS. 4-6, in which a visual appearance of the upgradeable game object is upgraded a third time, and in which a credit value associated with the upgradeable game object is increased a third time.

FIGS. 6-7 show several schematic views of wagering game 400, in which upgradeable game object 412 is incrementally upgraded or improved. Specifically, at FIG. 6, upgradeable game object 412 is displayed in association with a third, partially upgraded or partially renovated, visual appearance (e.g., a third stage of completion). The third visual appearance illustrates one or more additional upgrades to upgradeable game object 412. For example, in at least one embodiment, one or more gables and/or dormers of upgradeable game object 412 may be improved or embellished. As described above, pointer 416 of completion meter 414 may, in addition, be moved by game controller 202 to correspond to a location and/or an area of range of completion 418 that is indicative of the renovation or upgrade status of the house.

Similarly, at FIG. 7, upgradeable game object 412 is displayed in association with a fourth, completely upgraded or completely renovated visual appearance (e.g., a fourth stage of completion). The fourth and final visual appearance illustrates several additional upgrades to upgradeable game object 412. For example, in at least one embodiment, several window planters may be added to upgradeable game object 412. Further, as described above, pointer 416 of completion meter 414 may, in addition, be moved by game controller 202 to correspond to a location and/or an area of range of completion 418 that is indicative of the renovation or upgrade status of the house.

Thus, upgradeable game object 412 may continue to receive upgrades, as described above, until the specified trigger condition occurs, until upgradeable game object 412 is completely upgraded or improved, and/or until the player selects an option to cash out of wagering game 400. In any of these cases, game controller 202 may, in response, add the credit value of upgradeable game object 412 to the player's credit balance. For example, if the specified trigger condition occurs (e.g., if there are at least three "auction" or "for sale" symbols displayed), game controller 202 may depict a "sale" or "auction" of upgradeable game object 412 as well as add all or a portion of the credit value associated with upgradeable game object 412 to the player's credit balance (step 314). In some embodiments the credit value awarded to the player when a "sale" or "auction" of upgradable game object 412 is triggered may be greater than an estimated credit value 417 associated with upgradable game object 412. In some embodiments the credit value awarded to the player following the player selecting to cash out of wagering game 400 may be less than an estimated credit value 417 associated with upgradable game object 412.

For example, in the case of a house, game controller 202 may depict a sale of auction of the house in response to occurrence of the trigger condition. The credit value associated with the (upgraded) house may be added to the player's credit balance. Thus, during gameplay, from a player perspective, the house may be "sold" or "auctioned" and the credit value of the house, which the player may perceive as equity in the upgraded house, may be added to the player's credit balance as a result of the sale or auction. Similarly, in the case of a vehicle, the credit value associated with the (upgraded) vehicle may be added to the player's credit balance, such that, from the player's perspective, the vehicle is auctioned or sold.

In some embodiments, a "sold" or "auctioned" value of upgradeable game object 412, such as a house, as described herein, may not be immediately cashed out or otherwise provided to player. Rather, in at least some embodiments, a "virtual gaming experience" may be presented, in which a value of associated with upgradeable game object 412, such as, for example, a "sold" or "auctioned" value, may be saved or stored, such as by a computer memory accessible by game controller 202.

In such a case, the value of upgradeable game object 412 may also be retrieved from the computer memory by game controller 202 and/or by another other computer processor associated with the user (e.g., a computer processor of a mobile communications device, such as a smart phone, of the user), such that wagering game 400 may be resumed at a later time and/or by a different (or the same) electronic device. For instance, a value of upgradeable game object 412 may be retrieved by an EGM 104A-104X at a later time to resume or transfer wagering game 400 to the EGM 104A-104X and/or by a computer processor of a smartphone of a user to resume, or transfer, wagering game 400 to the smartphone.

Further, in at least some embodiments, a "social gaming experience" may be implemented with and/or added to wagering game 400. As used herein, a "social gaming experience" may include any game functionality, such as any graphical user interface, any communications protocol and/or communications functionality, and the like, that may facilitate and/or enable communications, such as text messaging, voice messaging, video chat, and the like. In one example, a "social gaming experience" may be added to wagering game 400, in which a player of a first EGM 104A and a player of a second EGM 104B are enabled to communicate, such as via any of the communications mechanisms described above. Communications may include any communications pertinent to wagering game 400 (such as, for example, an offer by a player of EGM 104A to purchase an upgradeable game object of a player of EGM 104B) and/or any other communications related or unrelated to wagering game 400.

In some cases, a credit multiplier may be applied to the credit value of upgradeable game object 412. For instance, the credit value of upgradeable game object 412 may be multiplied by a multiplier or multiplication factor in response to an occurrence of the specified trigger condition (e.g., in response to sale or auction) and/or in response to a determination that upgradeable game object 412 is completely upgraded or improved (e.g., as shown at FIG. 7).

Game controller 202 may, in addition, reset or reduce the credit value of upgradeable game object 412 by the amount added to the player's credit balance (step 316). Game controller 202 may also return the visual appearance of upgradeable game object 412 to an initial or starting visual appearance (e.g., the visual appearance shown at FIG. 4) (step 316). However, in the event that game controller 202 only adds a portion of the credit value of upgradeable game object 412 to the player's credit balance, the visual appearance of upgradeable game object 412 may be returned to an intermediate visual appearance, such as, for example, the second or third visual appearances (as shown at FIG. 5 and FIG. 6).

Thus, an electronic gaming machine configured to present a wagering game in which an upgradeable game object displayed during the wagering game is upgraded and accrues value is described. In particular, a plurality of reels of the wagering game are spun and stopped, and a game outcome is determined based upon one or more symbol combinations occurring on the spun and stopped reels. If a minimum number of special symbols, such as at least three scatter symbols, are displayed, the upgradeable game object may be upgraded. During the upgrade, a visual appearance of the upgradeable game object may be incrementally improved or upgraded, such as, for example, from one stage of completion to a next, upgraded, stage of completion. In addition, a credit value associated with the upgradeable game object may be increased. The plurality of reels may be further evaluated to determine whether a specified trigger condition has occurred. In some embodiments, the specified trigger condition may be triggered in response to the occurrence of a minimum number of trigger symbols, such as a minimum number of "for sale" or "auction" symbols. In response to occurrence of the trigger condition, the upgradeable game object may be "sold" or "auctioned" and a credit value of the upgradeable game object added to the player's credit balance.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:

a display device;

a memory device with instructions stored thereon; and a processor in communication with the display device and the memory device, wherein the instructions, when executed by the processor, cause the processor to:

cause display of an upgradeable object in a first state on the display device, wherein the upgradeable object being in the first state is associated with a first value of the upgradeable object, and wherein the first value is an initial value of the upgradeable object and is a nonzero value;

cause display of a plurality of symbols associated with a game outcome on the display device;

determine that the plurality of symbols includes at least one trigger symbol, the at least one trigger symbol comprising a first trigger;

determine to apply an upgrade to the upgradeable object based upon determining that the plurality of symbols includes the at least one trigger symbol;

determine the upgrade to apply to the upgradeable object based upon a selected volatility level of a plurality of volatility levels, wherein upgrades based upon selection a low volatility level of the plurality of volatility levels are associated with less significant upgrades to the upgradeable object than upgrades based upon selection of a high volatility level of the plurality of volatility levels;

apply the upgrade to the upgradeable object on the display device, wherein application of the upgrade causes the upgradeable object to be displayed in a second state on the display device, wherein the upgradeable object being in the second state is associated with a second value of the upgradeable object, and wherein the second value is greater than the first value;

determine that a second trigger has occurred; and provide the second value of the upgradeable object in response to the second trigger occurring.

2. The electronic gaming device of claim 1, wherein the instructions further cause the processor to:

cause display of a second plurality of symbols associated with a second game outcome on the display device;

determine that the second plurality of symbols includes at least one second trigger symbol;

determine a second upgrade to apply to the upgradeable object based upon determining that the second plurality of symbols includes the at least one second trigger symbol; and apply the second upgrade to the upgradeable object on the display device, wherein application of the second upgrade causes the upgradeable object to be displayed in a third state on the display device.

3. The electronic gaming device of claim 1, wherein the instructions further cause the processor to:

cause display of a second plurality of symbols associated with a second game outcome on the display device;

determine that the second plurality of symbols includes at least one second trigger symbol, the second trigger comprising the at least one second trigger symbol being displayed; and cause display of the upgradeable object in the first state on the display device based upon the second value being provided, wherein the first state comprises a beginning state of the upgradeable object.

4. The electronic gaming device of claim 1, wherein the instructions further cause the processor to:

receive player input selecting an area of the upgradeable object to upgrade; and apply the upgrade to the area of the upgradeable object on the display device.

5. The electronic gaming device of claim 1, wherein the upgradeable object comprises at least one of a house, car, or recreational vehicle.

6. The electronic gaming device of claim 1, wherein the instructions further cause the processor to receive a player input, wherein the second trigger comprises the player input.

7. The electronic gaming device of claim 1, wherein the instructions further cause the processor to:

cause display of a first amount of completion on a meter when the upgradeable object is displayed in the first state, the first amount of completion on the meter corresponding to a first amount of progress toward a fully upgraded state of the upgradeable object; and cause display of a second amount of completion on the meter when the upgradeable object is displayed in the second state, the second amount of completion on the meter corresponding to a second amount of progress toward the fully upgraded state of the upgradeable object.

8. An electronic gaming system comprising:

at least one display device;

at least one memory device with instructions stored thereon; and at least one processor in communication with the at least one display device and the at least one memory device, wherein the instructions, when executed by the at least one processor, cause the at least one processor to:

cause display of an upgradeable object in a first state on the at least one display device, wherein the upgradeable object being in the first state is associated with a first value of the upgradeable object, and wherein the first value is an initial value of the upgradeable object and is a nonzero value;

cause display of a plurality of symbols associated with a game outcome on the at least one display device;

determine that the plurality of symbols includes at least one trigger symbol, the at least one trigger symbol comprising a first trigger;

determine to apply an upgrade to the upgradeable object based upon determining that the plurality of symbols includes the at least one trigger symbol;

determine the upgrade to apply to the upgradeable object based upon a selected volatility level of a plurality of volatility levels, wherein upgrades based upon selection a low volatility level of the plurality of volatility levels are associated with less significant upgrades to the upgradeable object than upgrades based upon selection of a high volatility level of the plurality of volatility levels;

apply the upgrade to the upgradeable object on the at least one display device, wherein application of the upgrade causes the upgradeable object to be displayed in a second state on the at least one display device, wherein the upgradeable object being in the second state is associated with a second value of the upgradeable object, and wherein the second value is greater than the first value;

determine that a second trigger has occurred; and provide the second value of the upgradeable object in response to the second trigger occurring.

9. The electronic gaming system of claim 8, wherein the instructions further cause the at least one processor to:

cause display of a second plurality of symbols associated with a second game outcome on the at least one display device;

determine that the second plurality of symbols includes at least one second trigger symbol;

determine a second upgrade to apply to the upgradeable object based upon determining that the second plurality of symbols includes the at least one second trigger symbol; and apply the second upgrade to the upgradeable object on the at least one display device, wherein application of the second upgrade causes the upgradeable object to be displayed in a third state on the at least one display device.

10. The electronic gaming system of claim 8, wherein the instructions further cause the at least one processor to:

determine the first value of the upgradeable object; and determine the second value of the upgradeable object.

11. The electronic gaming system of claim 8, wherein the instructions further cause the at least one processor to:

cause display of a second plurality of symbols associated with a second game outcome on the at least one display device;

determine that the second plurality of symbols includes at least one second trigger symbol, the second trigger comprising the at least one second trigger symbol being displayed; and cause display of the upgradeable object in the first state on the at least one display device based upon the second value being provided, wherein the first state comprises a beginning state of the upgradeable object.

12. The electronic gaming system of claim 11, wherein the instructions further cause the at least one processor to cause display of the upgradeable object in the first state on the at least one display device based upon providing the second value.

13. The electronic gaming system of claim 8, wherein the instructions further cause the at least one processor to:

receive player input selecting an area of the upgradeable object to upgrade; and apply the upgrade to the area of the upgradeable object on the at least one display device.

14. The electronic gaming system of claim 8, wherein the upgradeable object comprises at least one of a house, car, or recreational vehicle.

15. A non-transitory computer-readable storage medium with instructions stored thereon that, in response to execution by a processor, cause the processor to:

cause display of an upgradeable object in a first state on a display device, wherein the upgradeable object being in the first state is associated with a first value of the upgradeable object, and wherein the first value is an initial value of the upgradeable object and is a nonzero value;

cause display of a game outcome on the display device;

determine that the game outcome satisfies a first trigger condition, the first trigger condition including at least one trigger symbol being included in the game outcome;

determine to apply an upgrade to the upgradeable object based upon determining that the first trigger condition is satisfied;

determine the upgrade to apply to the upgradeable object based upon a selected volatility level of a plurality of volatility levels, wherein upgrades based upon selection a low volatility level of the plurality of volatility levels are associated with less significant upgrades to the upgradeable object than upgrades based upon selection of a high volatility level of the plurality of volatility levels;

apply the upgrade to the upgradeable object on the display device, wherein application of the upgrade causes the upgradeable object to be displayed in a second state on the display device, wherein the upgradeable object being in the second state is associated with a second value of the upgradeable object, and wherein the second value is greater than the first value;

determine that a second trigger condition has occurred; and provide the second value of the upgradeable object in response to the second trigger condition occurring.

16. The non-transitory computer-readable storage medium of claim 15, wherein the instructions further cause the processor to:

cause display of a second game outcome on the display device;

determine that the second game outcome satisfies the first trigger condition;

determine a second upgrade to apply to the upgradeable object based upon determining that the second game outcome satisfies the first trigger condition; and apply the second upgrade to the upgradeable object on the display device, wherein application of the second upgrade causes the upgradeable object to be displayed in a third state on the display device.

17. The non-transitory computer-readable storage medium of claim 15, wherein the instructions further cause the processor to:

determine the first value of the upgradeable object; and determine the second value of the upgradeable object.

18. The non-transitory computer-readable storage medium of claim 15, wherein the instructions further cause the processor to:

cause display of a second game outcome on the display device;

determine that the second game outcome satisfies the second trigger condition, the second trigger condition comprising a second trigger symbol being displayed; and cause display of the upgradeable object in the first state on the display device, wherein the first state comprises a beginning state of the upgradeable object.

19. The non-transitory computer-readable storage medium of claim 18, wherein the instructions further cause the processor to cause display of the upgradeable object in the first state on the display device based upon the second value being provided.

20. The non-transitory computer-readable storage medium of claim 15, wherein the instructions further cause the processor to:

receive player input selecting an area of the upgradeable object to upgrade; and apply the upgrade to the area of the upgradeable object on the display device.

* * * * *